US009843934B1

(12) United States Patent
Jiang et al.

(10) Patent No.: US 9,843,934 B1
(45) Date of Patent: Dec. 12, 2017

(54) SYSTEMS AND METHODS FOR DETECTING PUBLIC NETWORKS

(71) Applicant: Symantec Corporation, Mountain View, CA (US)

(72) Inventors: Kevin Jiang, Lafayette, MA (US); Ilya Sokolov, Boston, CA (US)

(73) Assignee: Symantec Corporation, Mountain View, CA (US)

( * ) Notice: Subject to any disclaimer, the term of this patent is extended or adjusted under 35 U.S.C. 154(b) by 177 days.

(21) Appl. No.: 14/968,939

(22) Filed: Dec. 15, 2015

(51) Int. Cl.
*H04L 29/06* (2006.01)
*H04W 12/08* (2009.01)
*H04W 84/12* (2009.01)
*H04L 12/26* (2006.01)

(52) U.S. Cl.
CPC ............. *H04W 12/08* (2013.01); *H04L 43/16* (2013.01); *H04W 84/12* (2013.01)

(58) Field of Classification Search
CPC ................................ H04L 63/10; H04L 63/08
See application file for complete search history.

(56) References Cited

U.S. PATENT DOCUMENTS

| 8,073,959 B2 * | 12/2011 | Garg | ................... H04L 12/4625 370/254 |
| 2013/0318572 A1 * | 11/2013 | Singh | ................... H04W 12/08 726/4 |

OTHER PUBLICATIONS

"Private WiFi", https://www.privatewifi.com/how-it-works/, as accessed Oct. 14, 2015, (Jan. 3, 2014).

* cited by examiner

*Primary Examiner* — Izunna Okeke
(74) *Attorney, Agent, or Firm* — FisherBroyles, LLP

(57) ABSTRACT

A computer-implemented method for detecting public networks may include (1) calculating, based on packet information collected from a set of client devices, a count of unique client devices communicating with a local area wireless network over a period of time, (2) determining that the count of unique client devices exceeds a predefined security threshold number of unique client devices, (3) estimating, based on determining that the count of unique client devices exceeds the predefined security threshold number, that the local area wireless network corresponds to a public wireless network, (4) receiving a request for information indicating whether the local area wireless network corresponds to a public wireless network, and (5) transmitting, in response to the request, a network packet indicating that the local area wireless network has been flagged as the public wireless network. Various other methods, systems, and computer-readable media are also disclosed.

20 Claims, 6 Drawing Sheets

SYSTEMS AND METHODS FOR DETECTING PUBLIC NETWORKS

BACKGROUND

Public wireless networks may pose special security threats to network users and administrators. For example, public wireless networks may enable any person or guest to access these networks without performing any security check or identity authentication. Accordingly, attackers and malicious users may readily obtain access to these wireless networks and carry out attacks on corresponding computing resources. For example, public wireless networks may enable any user to readily sniff, obtain, read, or parse network communications between other users and a shared access point.

Notably, wireless networks may be public in two different senses. First, the wireless networks may simply be open and unencrypted, without requiring a user password to access these networks. Alternatively, the wireless networks may be password-protected but the establishment, organization, and/or administrator may provide free or ready access to the password. For example, a coffee shop may provide the Wi-Fi password to any guests who enter the coffee shop (e.g., optionally including non-customers). Because wireless networks may be public in multiple senses, security software products may have difficulty in distinguishing between public wireless networks and private wireless networks, as discussed further below. Nevertheless, security vendors may seek to alert users, or perform other remedial actions, when detecting that a wireless network is public. Accordingly, the instant disclosure identifies and addresses a need for additional and improved systems and methods for detecting public networks.

SUMMARY

As will be described in greater detail below, the instant disclosure generally relates to systems and methods for detecting public networks by, for example, calculating a number of unique client devices communicating with a wireless network over a period of time and then analyzing the count of unique client devices to determine whether the count indicates that the wireless network is public or private, as discussed further below. In general, the systems and methods may crowdsource information about unique client devices communicating with various wireless networks to estimate the count of unique client devices and/or the criteria indicating the presence of a public wireless network.

In one example, a computer-implemented method for detecting public networks may include (1) calculating, based on packet information collected from a set of client devices, a count of unique client devices communicating with a local area wireless network over a period of time, (2) determining that the count of unique client devices exceeds a predefined security threshold number of unique client devices, (3) estimating, based on determining that the count of unique client devices exceeds the predefined security threshold number, that the local area wireless network corresponds to a public wireless network, (4) receiving a request for information indicating whether the local area wireless network corresponds to a public wireless network, and (5) transmitting, in response to the request, a network packet indicating that the local area wireless network has been flagged as the public wireless network.

In one embodiment, estimating that the local area wireless network corresponds to the public wireless network is based on a security profile including criteria corresponding to the predefined security threshold number. The criteria may distinguish between a number of unique client devices indicating a private wireless network and a number of unique client devices indicating a public wireless network.

In one embodiment, the public wireless network may include one of: (1) an open wireless network that lacks a user password to establish a network connection and (2) a password protected wireless network for an establishment that provides public guests free access to a corresponding user password. In a further embodiment, the password protected wireless network is configured according to one of the WI-FI PROTECTED ACCESS protocol and the WI-FI PROTECTED ACCESS II protocol.

In one embodiment, the packet information collected from the set of client devices may include (1) information indicating a geographic location, (2) a service set identifier, (3) at least one media access control address for an access point for the service set identifier, and/or (4) at least one media access control address for a client device communicating with the access point.

In some examples, determining that the count of unique client devices exceeds the predefined security threshold number of unique client devices may include factoring a length of the period of time into the determining. In some examples, estimating that the local area wireless network corresponds to the public wireless network is further based on detecting a presence of a captive portal when first connecting to the local area wireless network.

In some examples, estimating that the local area wireless network corresponds to the public wireless network may include: (1) fingerprinting an access point wireless network frame to identify at least one of a manufacturer and a configuration setting for a corresponding access point and (2) determining that the manufacturer and/or the configuration setting is associated with public wireless network installations. In one embodiment, the computer-implemented method may further include notifying, by a client device that receives the network packet, a user that the local area wireless network has been flagged as the public wireless network.

In one embodiment, a security server collects the packet information from the set of client devices for the local area wireless network. Moreover, the security server may store the packet information within a centralized security vendor database that stores parallel packet information for different local area wireless networks across different geographic areas.

In one embodiment, a system for implementing the above-described method may include (1) a calculation module, stored in memory, that calculates, based on packet information collected from a set of client devices, a count of unique client devices communicating with a local area wireless network over a period of time, (2) a determination module, stored in memory, that determines that the count of unique client devices exceeds a predefined security threshold number of unique client devices, (3) an estimation module, stored in memory, that estimates, based on determining that the count of unique client devices exceeds the predefined security threshold number, that the local area wireless network corresponds to a public wireless network, (4) a reception module, stored in memory, that receives a request for information indicating whether the local area wireless network corresponds to a public wireless network, (5) a transmission module, stored in memory, that transmits, in response to the request, a network packet indicating that the local area wireless network has been flagged as the public wireless network, and (6) at least one physical processor configured to execute the calculation module, the determination module, the estimation module, the reception module, and the transmission module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) calculate, based on packet information collected from a set of client devices, a count of unique client devices communicating with a local area wireless network over a period of time, (2) determine that the count of unique client devices exceeds a predefined security threshold number of unique client devices, (3) estimate, based on determining that the count of unique client devices exceeds the predefined security threshold number, that the local area wireless network corresponds to a public wireless network, (4) receive a request for information indicating whether the local area wireless network corresponds to a public wireless network, and (5) transmit, in response to the request, a network packet indicating that the local area wireless network has been flagged as the public wireless network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
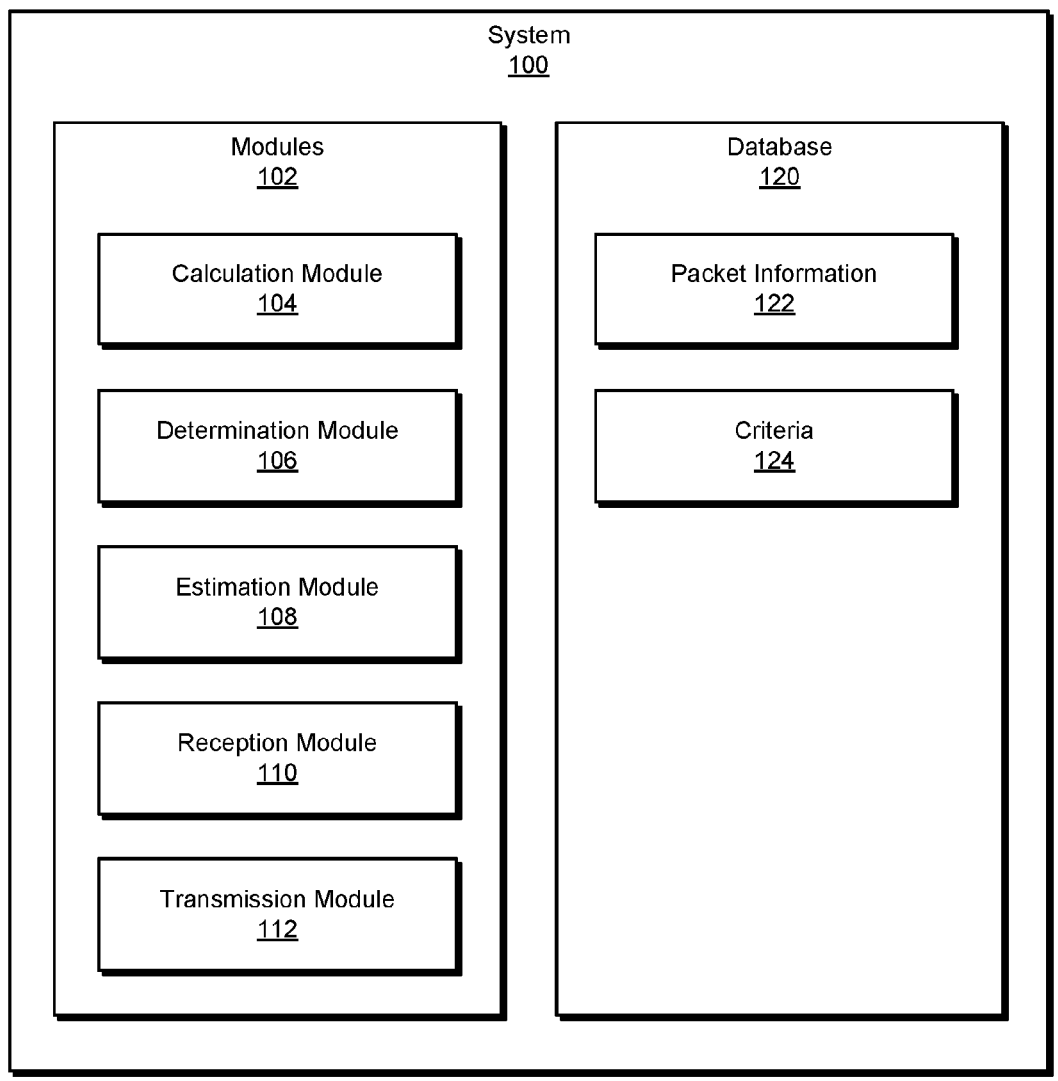
FIG. 1 is a block diagram of an exemplary system for detecting public networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting public networks. As will be explained in greater detail below, the disclosed systems and methods may effectively crowdsource information about wireless network communications to obtain new and improved insights about whether the corresponding wireless networks are public or private, as discussed further below. In response to detecting that a wireless network is public, or detecting an indication that the wireless network is public, a security server and/or a client-side software security product may alert one or more users about the public nature of the wireless network. The disclosed systems and methods may also perform any other suitable remedial action to protect users from detected public wireless networks.

Figure 2:
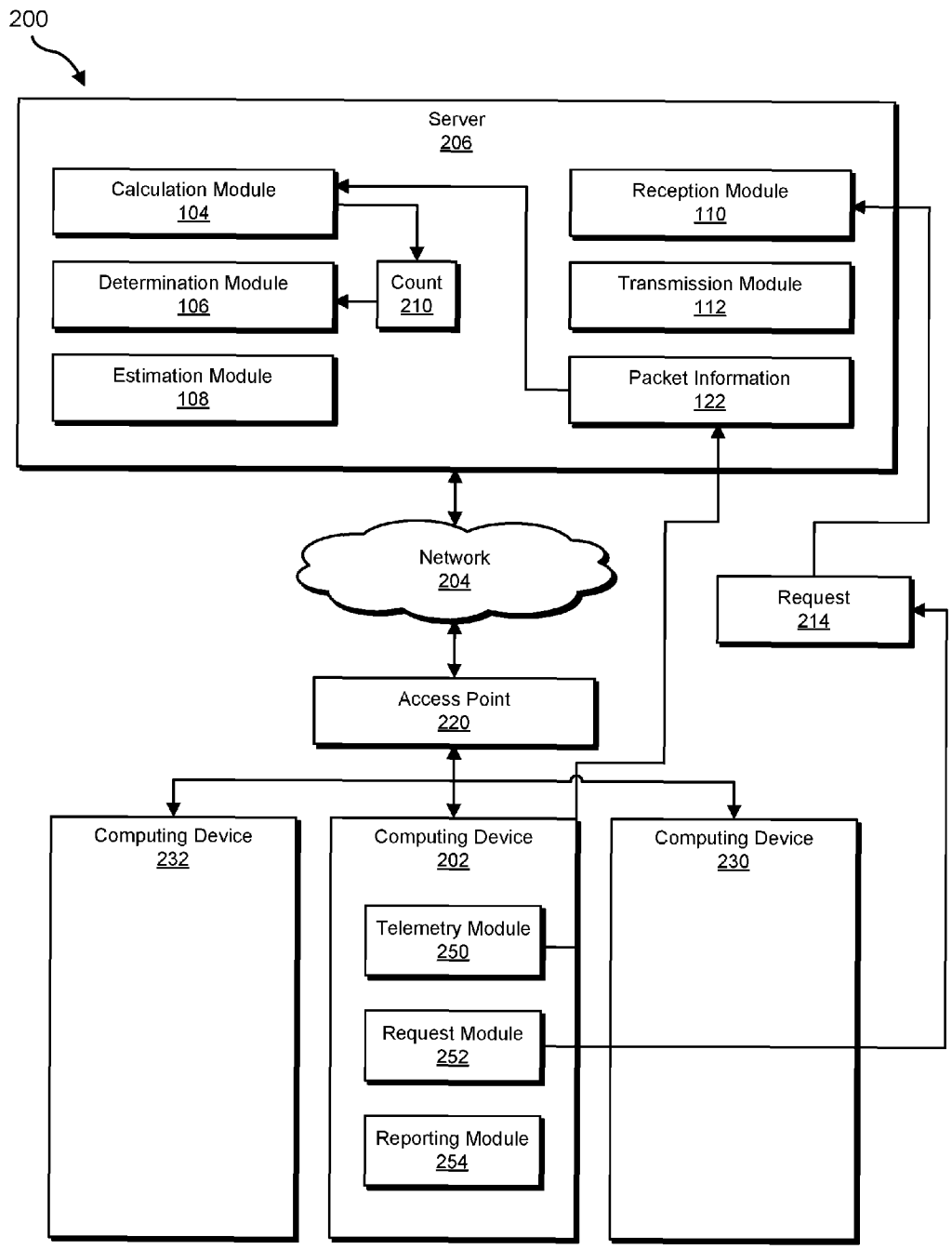
FIG. 2 is a block diagram of an additional exemplary system for detecting public networks.

The following will provide, with reference to FIGS. 1-2, detailed descriptions of exemplary systems for detecting public networks. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for detecting public networks. As illustrated in this figure, exemplary system 100 may include one or more modules 102 for performing one or more tasks. For example, and as will be explained in greater detail below, exemplary system 100 may also include a calculation module 104 that may calculate, based on packet information collected from a set of client devices, a count of unique client devices communicating with a local area wireless network over a period of time. Exemplary system 100 may additionally include a determination module 106 that may determine that the count of unique client devices exceeds a predefined security threshold number of unique client devices. Exemplary system 100 may also include an estimation module 108 that may estimate, based on determining that the count of unique client devices exceeds the predefined security threshold number, that the local area wireless network corresponds to a public wireless network. Exemplary system 100 may additionally include a reception module 110 that may receive a request for information indicating whether the local area wireless network corresponds to a public wireless network. Exemplary system 100 may furthermore include a transmission module 112 that may transmit, in response to the request, a network packet indicating that the local area wireless network has been flagged as the public wireless network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store packet information 122, which a centralized security server may collect from multiple client devices, such as client devices that have installed the same or mutually-compatible software security product (e.g., an antivirus and/or intrusion prevention system software product). The software product, as part of a client device, may collect and report information about wireless packets that the client device transmits or receives and/or that the software product detects from other client devices to the same access point or wireless network. Based on that information, a centralized security server may effectively count, through crowdsourcing, a number of unique client devices communicating with the wireless network over a period of time. Based on the count (and/or other factors that distinguish public and private wireless networks), the server and/or the client-side software product may determine an estimation of likelihood, and/or a categorization, of the wireless network as either public or private as discussed further below. Additionally, database 120 may also be configured to store criteria 124, which may establish statistics, analyses, formulas, factors, and/or any other criteria for distinguishing between public and private wireless networks (e.g., based on the count of unique client devices).

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect public networks. For example, and as will be described in greater detail below, calculation module 104 may calculate, based on packet information 122 collected from a set of client devices (such as computing device 202, a computing device 230, and a computing device 232), a count 210 of unique client devices communicating with a local area wireless network (e.g., network 204) over a period of time. Determination module 106 may determine that count 210 of unique client devices exceeds a predefined security threshold number of unique client devices. Estimation module 108 may estimate, based on determining that count 210 of unique client devices exceeds the predefined security threshold number, that the local area wireless network corresponds to a public wireless network. Reception module 110 may receive a request 214 for information indicating whether the local area wireless network corresponds to a public wireless network. Transmission module 112 may transmit, in response to request 214, a network packet indicating that the local area wireless network has been flagged as the public wireless network.

Notably, FIG. 2 also shows an access point 220 that the computing devices may use to access network 204. Additionally, computing device 202 (which may parallel the other computing devices in hardware and/or software functionality) may further include a telemetry module 250, which may report packet information 122, as discussed further below. Computing device 202 may also include a request module 252, which may issue request 214 automatically and/or manually in response to a user command, as discussed further below. Furthermore, computing device 202 may also include a reporting module 254, which may alert the user to an estimated and/or categorized status of the wireless network as public or private. Reporting module 254 may also perform any other suitable remedial action, such as blocking or diminishing the network connection, prompting for user approval to establish the network connection, and/or heightening or enabling one or more security measures, such as antivirus, firewall, virtual private network, and/or other security settings.

Notably, the various modules of FIG. 2 are located at a specific one of server 206 and computing device 202. Nevertheless, in other examples, one or more of these modules may be relocated to the other computing resource (e.g., from the server to the client and vice versa). Additionally, parts of a module or a copy of a module may be located at both the server and the client. In general, server 206 and computing device 202 may cooperate and/or share functionality in any suitable manner to perform the intended calculation, estimation, and/or reporting or alerting functionality of the systems and methods described herein to thereby protect users from public wireless networks.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of facilitating the detection of public wireless networks. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
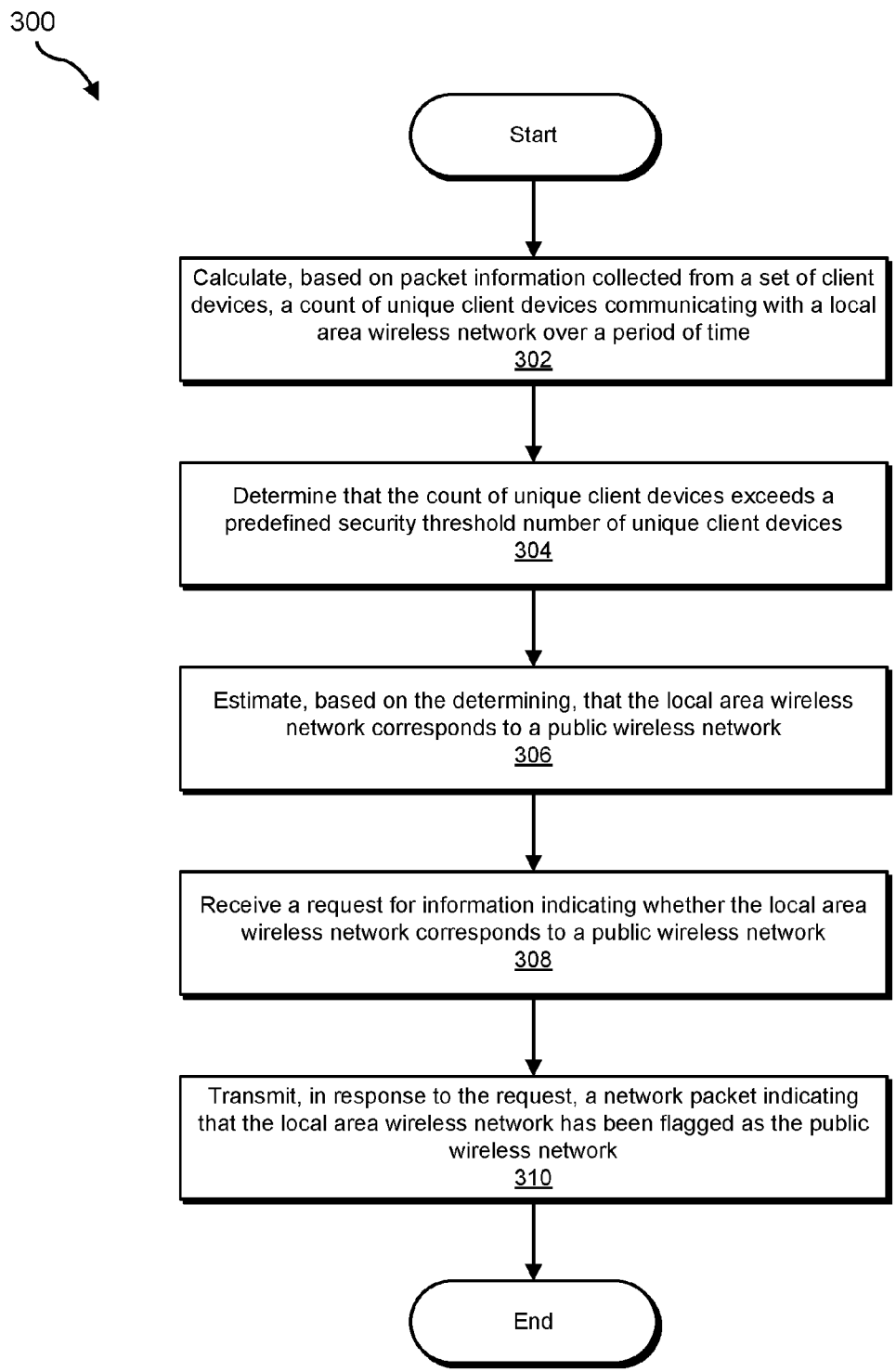
FIG. 3 is a flow diagram of an exemplary method for detecting public networks.

FIG. 3 is a flow diagram of an exemplary computer-implemented method 300 for detecting public networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may calculate, based on packet information collected from a set of client devices, a count of unique client devices communicating with a local area wireless network over a period of time. For example, calculation module 104 may, as part of server 206 in FIG. 2, calculate, based on packet information 122 collected from a set of client devices, count 210 of unique client devices communicating with network 204 over a period of time.

As used herein, the term "set of client devices" generally refers to one or more client devices. These client devices may have installed a software security product, as outlined above. The software security product may (1) report telemetry information about wireless network communications to enable a centralized security vendor server to aggregate the information from numerous client devices and learn about corresponding wireless networks and/or (2) request and receive one or more items of information indicating, based on one or more of the analyses, factors, comparisons, and/or calculations described herein, whether an identified wireless network is public or private. The software security product may perform one or both of these features automatically, semi-automatically, autonomously, and/or according to a predefined schedule (e.g., in the background of an operating system such as ANDROID).

The items of information reported to the server and/or received by the client device may include a (1) count of unique client devices communicating with the wireless network (which may correspond to a final count or which may be supplemented by information that the requesting client device obtains itself and optionally reports to the centralized server), (2) a predefined security threshold number of unique client devices, which may be calculated, estimated, maintained, and/or updated by the centralized server, (3) a calculated estimation or degree of likelihood that the identified wireless network is public, (4) a binary categorization of the identified wireless network as public or private, (5) any other factor or item of information that tends to indicate whether the wireless network is public, (6) one or more windows of time, sub-windows of time (within a larger window of time), and/or interval used in determining whether the count exceeds the threshold, as discussed below, and/or (7) any other item of information on which any of the above items of information may be based or calculated.

Moreover, as used herein, the term "count of unique client devices" generally refers to a count of different physical and/or virtual devices that communicate with the wireless network (e.g., with an access point of the wireless network) over a period of time (e.g., if the same device communicates or connects multiple times, then that does not necessarily increase the count). Notably, in some examples, client devices may communicate with the access point without necessarily connecting to the wireless network or attempting to connect to the wireless network. In alternative embodiments, the count of unique client devices may be substituted by a count of client device connections, connection attempts, and/or client queries or inquiries to an access point.

Moreover, as used herein, the term "packet information" generally refers to information describing one or more values, settings, and/or items of information obtained from one or more wireless network packets. For example, packet information may include values specifying one or more of a geolocation, service set identifier, and/or media access control number that have been stripped or ascertained from one or more wireless network packets that a client device transmitted, requested, sniffed, intercepted, and/or otherwise obtained and parsed.

Calculation module 104 may calculate the count of unique client devices in a variety of ways. In one embodiment, the packet information collected from the set of client devices may include at least one of: (1) information indicating a geographic location (e.g., a geolocation of a wireless network, of an access point, and/or of a client device), (2) a service set identifier, (3) at least one media access control address for an access point for the service set identifier, and/or (4) at least one media access control address for a client device communicating with the access point. In general, calculation module 104 may calculate the number of unique client devices at least in part by counting and/or hashing unique media access control addresses for client devices communicating with one or more access points for the wireless network (e.g., for the same service set identifier). Additionally, or alternatively, calculation module 104 may count any other number or identifier for distinguishing client devices, such as serial numbers, TRUSTED PLATFORM MODULE certificates, DEV ID certificates, and/or GLOBALLY UNIQUE IDENTIFIERS.

Moreover, in some examples, a security server may collect the packet information from the set of client devices for the local area wireless network. For example, the security server may store the packet information within a centralized security vendor database, such as database 120, that stores parallel packet information for different local area wireless networks across different geographic areas. In other words, a security vendor may provide a software security product or program, or a set of mutually compatible programs, that collectively report information about wireless networks to one or more backend security servers to enable the servers to aggregate and analyze the collected information and thereby estimate or categorize the wireless networks as either public or private, as discussed further below. Because a wide variety of users may purchase and/or install the security software, the security vendor may learn about a wide variety of wireless networks across a wide variety of geographic areas, thereby providing a more comprehensive and accurate database and service for any user or customer of the associated software security product.

At step 304, one or more of the systems described herein may determine that the count of unique client devices exceeds a predefined security threshold number of unique client devices. For example, determination module 106 may, as part of server 206 in FIG. 2, determine that count 210 of unique client devices exceeds the predefined security threshold number of unique client devices.

As used herein, the term "predefined security threshold number" generally refers to a number serving as a threshold or comparison value to determine whether the count of unique client devices is great enough to indicate that the identified wireless network is public. The number may be predefined in the sense that the number is defined or calculated prior to the comparison with the count of step 302. The number may be calculated or defined by a software product or system at server 206 and/or computing device 202. For example, the number may be derived using a clustering algorithm that distinguishes between a cluster of public wireless networks and a cluster of private wireless networks, as discussed further in connection with FIG. 4. In further examples, the predefined security threshold number may constitute one of a number of threshold numbers, each of which may indicate a greater degree of confidence that the wireless network is public (e.g., 10 client devices may indicate a confidence level of 0.5 on a 0.0-1.0 scale, 100 devices may indicate a confidence level of 0.9, etc.). The predefined security threshold number may be stored within a security profile and/or associated criteria at server 206 and/or computing device 202.

Determination module 106 may determine that the count exceeds the predefined security threshold number in a variety of ways. In general, determination module 106 may perform a comparison between two integers or other numerical values stored within a computing system. Determination module 106 may determine that one of the integers (i.e., the count) is greater than the other integer (i.e., the threshold number) according to the comparison operation. Similarly, determination module 106 may determine that the count is equal to another threshold number that corresponds to the original threshold number incremented by one (or perform any other suitably equivalent comparison operation).

At step 306, one or more of the systems described herein may estimate, based on determining that the count of unique client devices exceeds the predefined security threshold number, that the local area wireless network corresponds to a public wireless network. For example, estimation module 108 may, as part of server 206 in FIG. 2, estimate, based on determining that count 210 of unique client devices exceeds the predefined security threshold number, that the local area wireless network corresponds to a public wireless network.

As further discussed above, the wireless network may be public in at least one of two different ways. The wireless network may constitute an open wireless network that lacks a user password to establish a network connection. Alternatively, the wireless network may constitute a password protected wireless network for an establishment that provides public guests free access to a corresponding wireless network password. In general, any establishment that provides the wireless network password without performing a security check, requiring a customer purchase, verifying user identity, and/or logging user identity may render the wireless network public (where each of the narrower permutations of these, other than the broadest permutation, constitutes an alternative embodiment contemplated by the present disclosure). Moreover, the wireless network may also be public in the sense that predefined security criteria distinguish between public and private networks, and the wireless network simply satisfies the criteria (e.g., in terms of the count of client devices, the frequency of unique client device communications or turnover, the presence of a portal, the manufacturer and/or configuration settings for the access point, etc.). In one embodiment, the password protected wireless network is configured according to one of the WI-FI PROTECTED ACCESS protocol and the WI-FI PROTECTED ACCESS II protocol.

Estimation module 108 may estimate that the wireless network is public in a variety of ways. In general, estimation module 108 may calculate an estimated degree of likelihood or confidence that the wireless network is public. Additionally, or alternatively, estimation module 108 may categorize the wireless network as public. For example, estimation module 108 may categorize the wireless network based on a comparison between the estimated degree of likelihood and a predefined security threshold value. In general, estimation module 108 may be located at server 206 and/or computing device 202, which may individually, or in combination, perform one or more of steps 304 and 306, as further discussed above. In other words, server 206 and/or computing device 202 may contribute one or more items of information, such as the items of information listed above (e.g., the count, the threshold number, the window of time, the packet information) that the providing device uniquely possesses, thereby sharing the information with the other device to perform a more comprehensive or accurate calculation.

In one embodiment, estimation module 108 may estimate that the local area wireless network corresponds to the public wireless network based on a security profile comprising criteria corresponding to the predefined security threshold number. The criteria may distinguish between a number of unique client devices indicating a public wireless network and a number of unique client devices indicating a private wireless network.

Figure 4:
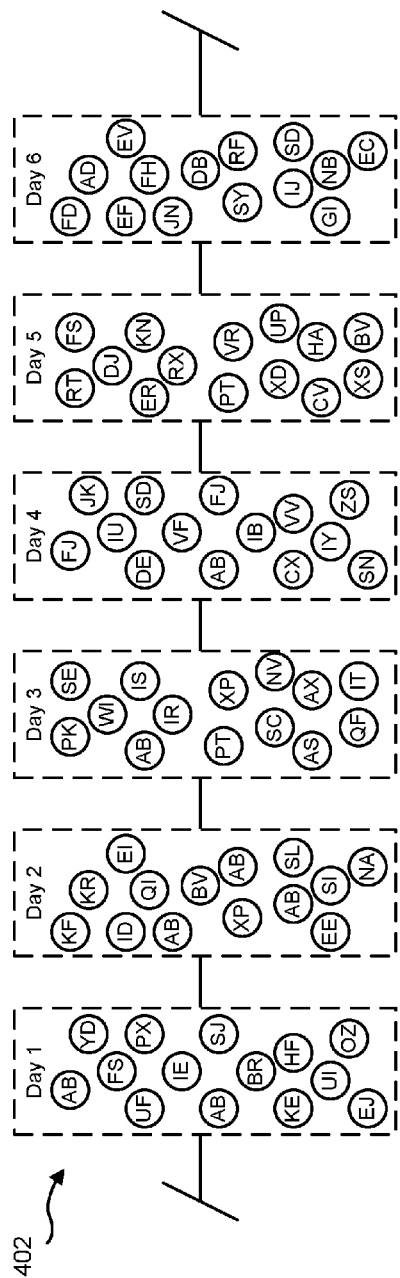
FIG. 4 is a diagram of two exemplary timelines further illustrating an example of the method for detecting public networks.
Figure 4:
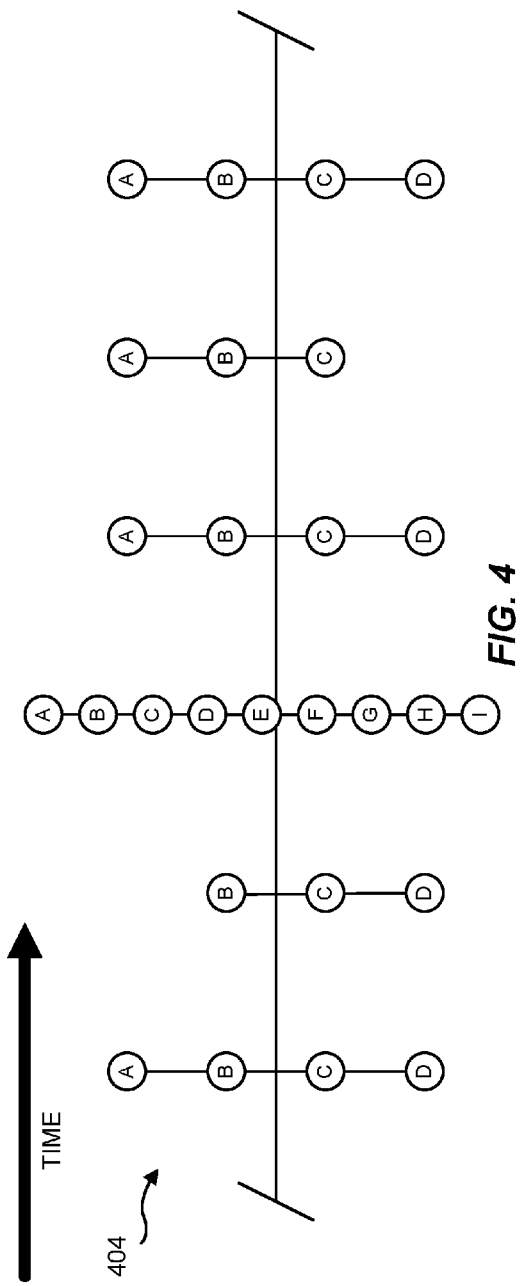

FIG. 4 shows two exemplary timelines that each illustrate unique client device communications on six different days. Timeline 402 indicates unique client device communications to a public wireless network that a coffee shop provides to any guest located within the coffee shop. As shown in this figure, the number of unique client devices is relatively large over the six days (which may correspond to the "period of time" of step 302). Although the number of unique client devices is limited by the size of the figure, a typical public wireless network, such as a coffee shop wireless network, may communicate with hundreds of unique client devices in a single day. Moreover, the turnover between unique client devices is relatively large over a 24 hour period of time (which may correspond to a sub-window of time or interval for estimating client device turnover). In other words, the client devices that communicate on one day are mostly different than the client devices that communicate on another day, which reflects the fact that random customers visit the coffee shop but generally do not visit everyday.

In contrast, timeline 404 indicates unique client device communications to a private wireless network associated with a family's house. As shown in this figure, the family has four members (A, B, C, and D) who each communicate with the wireless network on most days. Moreover, there is not a relatively large amount of turnover between client devices from day-to-day. Notably, on the third day shown in this figure, there is a small burst of activity with several new unique client computing devices communicating with the wireless network at the family's house (i.e., users E, F, G, H, and I). Nevertheless, this day represents a statistical outlier and these users do not return on any of the remaining days, nor do any of the remaining days show a similar burst of activity. Accordingly, day three represents a statistical outlier associated with an event, such as a house or dinner party, that is statistically unusual or deviant from the normal or statistically expected activity at the family's house.

In the example of this figure, the predefined security threshold number may correspond to 15. Accordingly, estimation module 108 may estimate or categorize the family's wireless network for timeline 404 as private, because the number of unique client devices communicating with the wireless network over the six days is nine (i.e., A, B, C, D, E, F, G, H, and I), which does not exceed the predefined security threshold number of 15. In contrast, timeline 402 shows that the count of unique client devices communicating with the coffee shop wireless network over the six days far exceeds the predefined security threshold number of 15 and, therefore, estimation module 108 may estimate or categorize the coffee shop wireless network as public.

In view of the above, estimation module 108 may use any suitable algorithm (e.g., clustering algorithm), analysis, statistical technique, and/or machine learning formula to distinguish between public wireless networks (which may be exemplified by the activity of timeline 402) and private wireless networks (which may be exemplified by the activity of timeline 404). For example, estimation module 108 may obtain large data sets describing large numbers of previously and accurately classified wireless networks and then use a machine learning algorithm or other algorithm to derive identifying features (e.g., unique client device counts), characteristics, and/or thresholds distinguishing between the two types of wireless networks. Similarly, estimation module 108 may obtain a large data set of non-classified wireless networks and then use a clustering algorithm to categorize some, all, or substantially all of the wireless networks into two different clusters, which correspond to private and public wireless networks, respectively (e.g., with manual intervention to match clusters to types of wireless network).

Alternatively, estimation module 108 may simply obtain or receive values, rules, and/or security policy criteria distinguishing between private and public wireless networks from a user, administrator, software security product, and/or software security product vendor (e.g., based on research and development by the vendor). In performing a statistical analysis, estimation module 108 may discard, or give lower weight, to one or more outlier events, such as day three on timeline 404, where outlier events are defined according to one or more statistical formulas and/or predefined threshold values indicating statistical deviance.

Moreover, estimation module 108 may also base the estimation or classification of the wireless network on a degree of turnover (e.g., an average degree of turnover) from one window of time to another window of time (or sub-window of time), such as the greater day-to-day turnover of unique client devices in timeline 402 as compared to timeline 404. Similarly, estimation module 108 may base the estimation or classification of the wireless network on an average number of unique client devices over a number of sub-windows of time (e.g., by taking an average, the outlier event of day three of timeline 404 may be outweighed by the smaller number of unique client devices on the other days of timeline 404, thereby enabling the family's wireless network to still be classified as private despite the outlier event of day three).

Additionally, in some examples, estimation module 108 may estimate that the local area wireless network corresponds to the public wireless network based on other criteria in addition to the count of unique client devices. For example, estimation module 108 may estimate that the local area wireless network corresponds to the public wireless network by detecting a presence of a captive portal when first connecting to the local area wireless network (e.g., because captive portals are associated with, and commonly used by, public wireless networks, such as wireless networks at many airports and coffee shops). Similarly, estimation module 108 may fingerprint an access point wireless network frame to identify a manufacturer and/or a configuration setting for a corresponding access point. Estimation module 108 may further determine that the manufacturer and/or configuration setting indicates a public wireless network through a machine learning analysis performed on a data set, a clustering algorithm analysis performed on a data set, and/or user or administrator input from a security service or vendor, as outlined above (e.g., because the manufacturer and/or configuration setting is associated with, and commonly used by, public wireless networks and associated access points, such as wireless networks at many airports and coffee shops).

In some examples, determination module 106 and/or estimation module 108 may determine that the count of unique client devices exceeds the predefined security threshold number of unique client devices by factoring a length of the period of time into the determining. In other words, estimation module 108 may base the estimation or classification of the wireless network on criteria reflecting that the count of unique client devices over a greater period of time is less likely to indicate a public wireless network than the same number of unique client devices over a shorter period of time. In other words, estimation module 108 may base the estimation or classification on a rate of unique client devices communicating with the wireless network over the period of time, in comparison to a predefined or security threshold rate.

At step 308, one or more of the systems described herein may receive a request for information indicating whether the local area wireless network corresponds to a public wireless network. For example, reception module 110 may, as part of server 206 in FIG. 2, receive request 214 for information indicating whether the local area wireless network corresponds to the public wireless network.

Reception module 110 may receive the request in a variety of ways. In general, computing device 202 may submit the request automatically, semi-automatically, autonomously, and/or manually in response to a user command. For example, a user may be curious about the level of safety of an available wireless network and issue a command to query a security vendor server for information about how public or unsecure the wireless network is. The security vendor server may transmit (1) an estimated degree of likelihood that the wireless network is public and/or unsecure, (2) a categorization of the wireless network as public and/or unsecure, (3) one or more items of information further enabling the client-side security software product to perform a parallel estimation or categorization step, and/or (4) any other information about known security risks or threats posed by the wireless network. Additionally, the security software product may issue the request automatically upon detecting the availability of the wireless network. In further examples, the security software product may prompt the user about whether to issue the request to the security vendor server.

At step 310, one or more of the systems described herein may transmit, in response to the request, a network packet indicating that the local area wireless network has been flagged as the public wireless network. For example, transmission module 112 may, as part of server 206 in FIG. 2, transmit, in response to request 214, a network packet indicating that the local area wireless network has been flagged as the public wireless network. As used herein, the phrase "flagged as the public wireless network" generally refers to specifying or reporting the detection of an indication that the wireless network is public.

Transmission module 112 may transmit the network packet in a variety of ways. In some examples, the network packet may flag one or more bits to specify that the wireless network has been categorized as public. In other examples, the network packet may specify a calculated degree of likelihood that the wireless network is public (e.g., as calculated by server 206). In further examples, the network packet may flag one or more bits to indicate that server 206 has received or detected at least one indication that the wireless network is public (e.g., received from another client device reporting a categorization of the wireless network by the other client device). In alternative embodiments, instead of reporting that the wireless network has been flagged as public, transmission module 112 may simply report one or more items of information, as outlined above, to enable computing device 202 itself to flag the wireless network as public.

Moreover, transmission module 112 may also transmit one or more alerts, notifications, prompts, and/or commands to further protect users from public wireless networks. For example, transmission module 112 may transmit a command to heighten or enable one or more security measures, such as antivirus, intrusion prevention system, firewall, and/or network security measures or settings. Similarly, transmission module 112 may transmit a command to block or diminish access to the wireless network. Moreover, transmission module 112 may transmit a command to isolate or quarantine server 206, network 204, and/or computing device 202. Additionally, transmission module 112 may simply transmit one or more of these commands in conditional form such that computing device 202 only performs the command upon prompting the user at the client device and receiving user approval. Alternatively, transmission module 112 may simply alert or report the security risk to the user without necessarily taking any other remedial action or heightening or enabling any other security measure. Moreover, although transmission module 112 at server 206 may transmit these commands and/or notifications, reporting module 254 at computing device 202 may instead transmit these commands and/or notifications itself or in cooperation with transmission module 112, as discussed above.

Moreover, transmission module 112 may also transmit a notification to prompt the user that the wireless network is public. For example, transmission module 112, as part of a data loss prevention system, may notify the user not to access or display sensitive information, thereby preventing surrounding members of the public from looking over the user's shoulder or seeing the display. Transmission module 112 may also trigger or enable one or more data loss prevention policies that diminish, restrict, and/or eliminate access to one or more items of sensitive data, as defined by a data loss prevention policy.

As explained above in connection with method 300 in FIG. 3, the disclosed systems and methods may effectively crowdsource information about wireless network communications to obtain new and improved insights about whether the corresponding wireless networks are public or private, as discussed further above. In response to detecting that a wireless network is public, or detecting an indication that the wireless network is public, a security server and/or a client-side software security product may alert one or more users about the public and/or unsecure nature of the wireless network. The disclosed systems and methods may also perform any other suitable remedial action to protect users from detected public and/or unsecure wireless networks.

Figure 5:
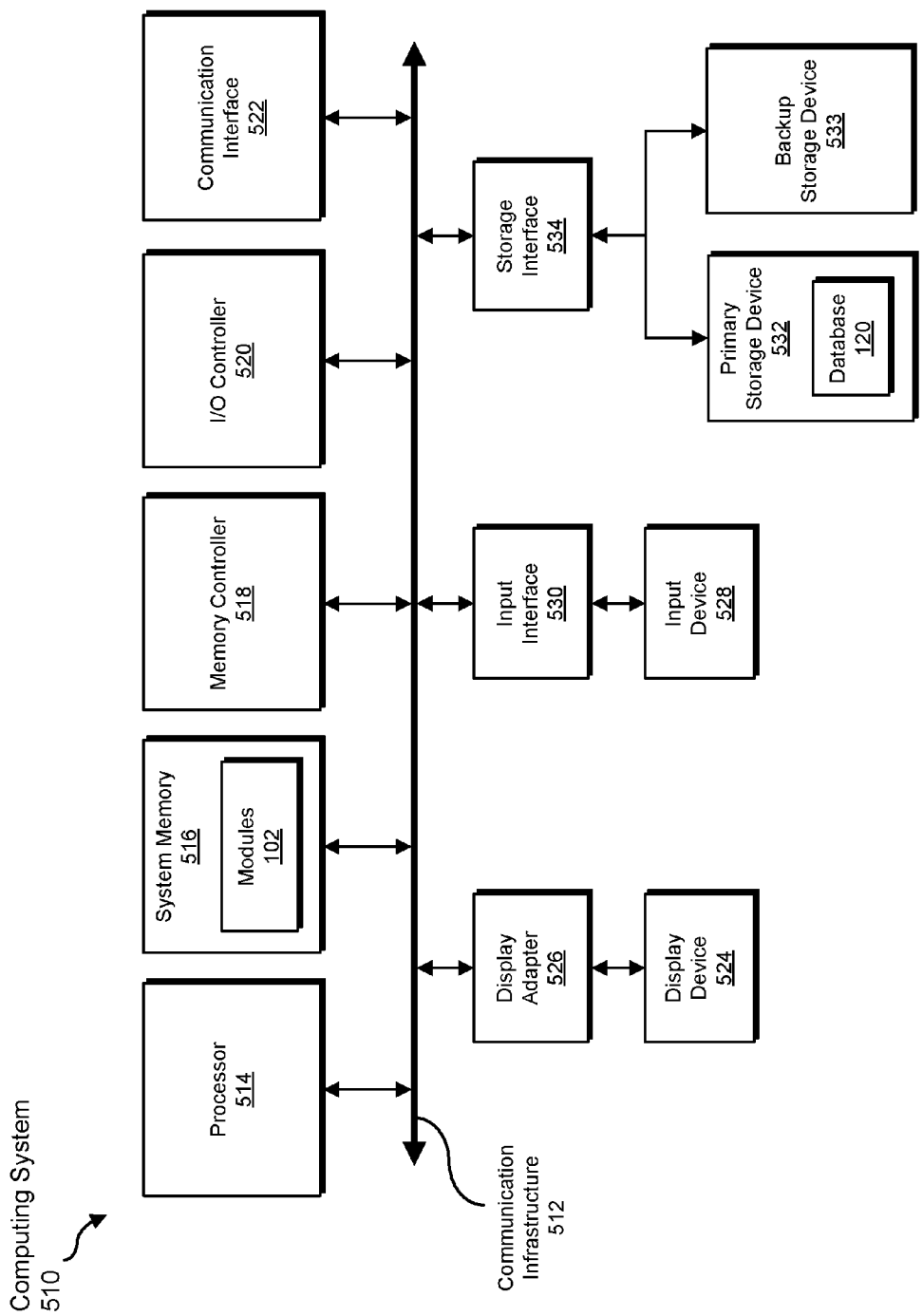
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
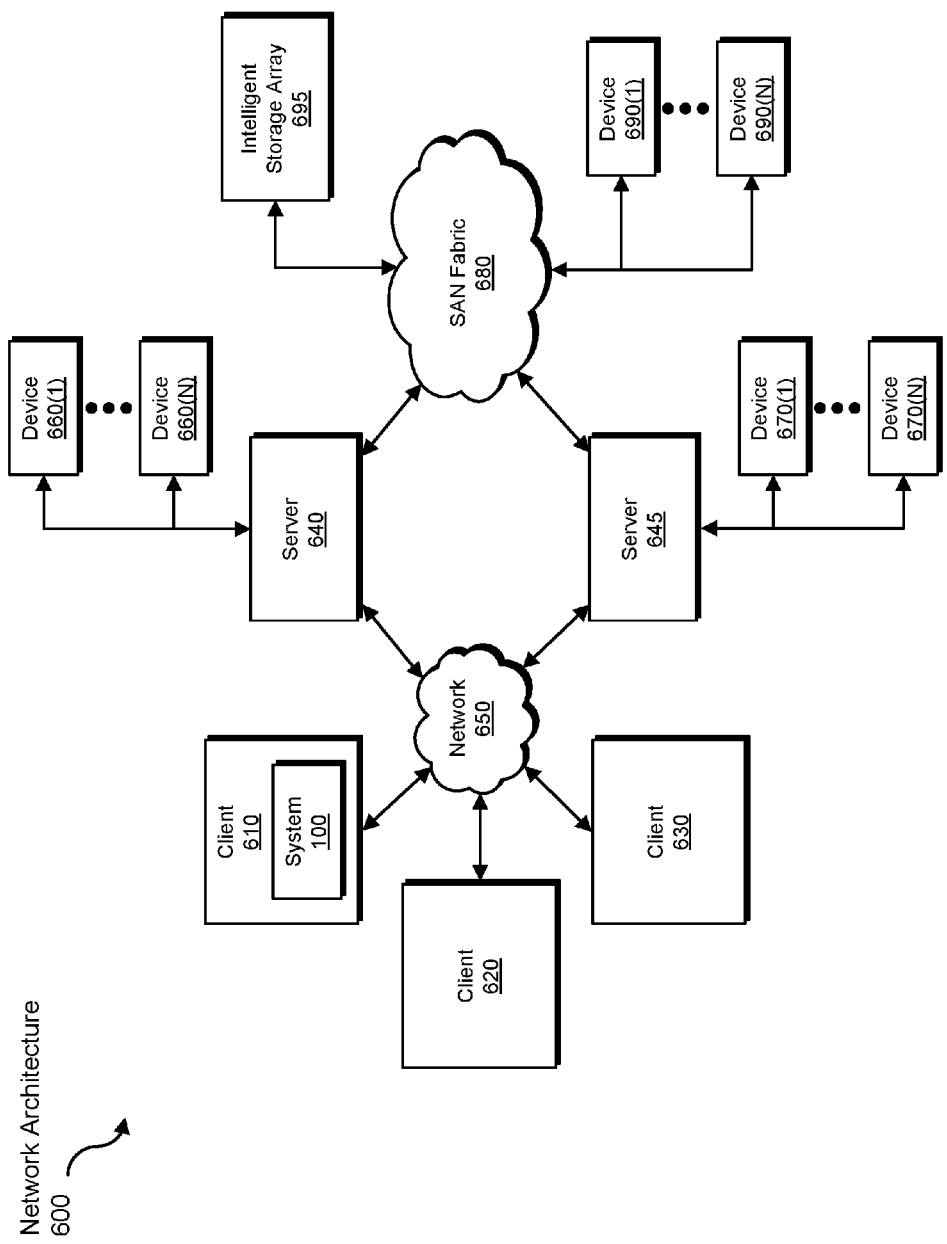
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting public networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting public networks, at least a portion of the method being performed by a computing device comprising at least one processor, the method comprising:
   calculating, based on packet information collected from a set of client devices, a count of unique client devices communicating with a local area wireless network over a period of time;
   determining that the count of unique client devices exceeds a predefined security threshold number of unique client devices;
   estimating that the local area wireless network corresponds to a public wireless network based on:
      determining that the count of unique client devices exceeds the predefined security threshold number;
      fingerprinting an access point wireless network frame to identify at least one of a manufacturer and a configuration setting for a corresponding access point; and
      determining that the at least one of the manufacturer and the configuration setting is associated with public wireless network installations;
   receiving a request for information indicating whether the local area wireless network corresponds to a public wireless network; and
   transmitting, in response to the request, a network packet indicating that the local area wireless network has been flagged as the public wireless network, wherein:
   a security server collects the packet information from the set of client devices for the local area wireless network; and
   the security server stores the packet information within a centralized security vendor database that stores parallel packet information for different local area wireless networks across different geographic areas.

2. The method of claim 1, wherein:
   estimating that the local area wireless network corresponds to the public wireless network is based on a security profile comprising criteria corresponding to the predefined security threshold number; and the criteria distinguish between:
  a number of unique client devices indicating a private wireless network; and
  a number of unique client devices indicating a public wireless network.

3. The method of claim 1, wherein the public wireless network comprises one of:
  an open wireless network that lacks a user password to establish a network connection; and
  a password protected wireless network for an establishment that provides public guests free access to a corresponding user password.

4. The method of claim 3, wherein the password protected wireless network is configured according to one of:
  the WI-FI PROTECTED ACCESS protocol; and
  the WI-FI PROTECTED ACCESS II protocol.

5. The method of claim 1, wherein the packet information collected from the set of client devices comprises at least one of:
  information indicating a geographic location; and
  a service set identifier.

6. The method of claim 1, wherein determining that the count of unique client devices exceeds the predefined security threshold number of unique client devices comprises factoring a length of the period of time into the determining.

7. The method of claim 1, wherein estimating that the local area wireless network corresponds to the public wireless network is further based on detecting a presence of a captive portal when first connecting to the local area wireless network.

8. The method of claim 1, wherein the packet information collected from the set of client devices comprises at least one media access control address for an access point for a service set identifier.

9. The method of claim 1, further comprising notifying, by a client device that receives the network packet, a user that the local area wireless network has been flagged as the public wireless network.

10. The method of claim 1, wherein the packet information collected from the set of client devices comprises at least one media access control address for a client device communicating with an access point.

11. A system for detecting public networks, the system comprising:
  a calculation module, stored in memory, that calculates, based on packet information collected from a set of client devices, a count of unique client devices communicating with a local area wireless network over a period of time;
  a determination module, stored in memory, that determines that the count of unique client devices exceeds a predefined security threshold number of unique client devices;
  an estimation module, stored in memory, that estimates that the local area wireless network corresponds to a public wireless network based on:
    determining that the count of unique client devices exceeds the predefined security threshold number;
    fingerprinting an access point wireless network frame to identify at least one of a manufacturer and a configuration setting for a corresponding access point; and
    determining that the at least one of the manufacturer and the configuration setting is associated with public wireless network installations;
  a reception module, stored in memory, that receives a request for information indicating whether the local area wireless network corresponds to a public wireless network;
  a transmission module, stored in memory, that transmits, in response to the request, a network packet indicating that the local area wireless network has been flagged as the public wireless network; and
  at least one physical processor configured to execute the calculation module, the determination module, the estimation module, the reception module, and the transmission module, wherein:
  a security server collects the packet information from the set of client devices for the local area wireless network; and
  the security server stores the packet information within a centralized security vendor database that stores parallel packet information for different local area wireless networks across different geographic areas.

12. The system of claim 11, wherein:
  the estimation module estimates that the local area wireless network corresponds to the public wireless network based on a security profile comprising criteria corresponding to the predefined security threshold number; and
  the criteria distinguish between:
    a number of unique client devices indicating a private wireless network; and
    a number of unique client devices indicating a public wireless network.

13. The system of claim 11, wherein the public wireless network comprises one of:
  an open wireless network that lacks a user password to establish a network connection; and
  a password protected wireless network for an establishment that provides public guests free access to a corresponding user password.

14. The system of claim 13, wherein the password protected wireless network is configured according to one of:
  the WI-FI PROTECTED ACCESS protocol; and
  the WI-FI PROTECTED ACCESS II protocol.

15. The system of claim 11, wherein the packet information collected from the set of client devices comprises at least one of:
  information indicating a geographic location; and
  a service set identifier.

16. The system of claim 11, wherein the determination module determines that the count of unique client devices exceeds the predefined security threshold number of unique client devices by factoring a length of the period of time into the determining.

17. The system of claim 11, wherein the estimation module estimates that the local area wireless network corresponds to the public wireless network based on detecting a presence of a captive portal when first connecting to the local area wireless network.

18. The system of claim 11, wherein the packet information collected from the set of client devices comprises at least one media access control address for an access point for a service set identifier.

19. The system of claim 11, wherein the transmission module notifies a user that the local area wireless network has been flagged as the public wireless network.

20. A non-transitory computer-readable medium comprising one or more computer-readable instructions that, when executed by at least one processor of a computing device, cause the computing device to:

calculate, based on packet information collected from a set of client devices, a count of unique client devices communicating with a local area wireless network over a period of time;

determine that the count of unique client devices exceeds a predefined security threshold number of unique client devices;

estimate that the local area wireless network corresponds to a public wireless network based on:
  determining that the count of unique client devices exceeds the predefined security threshold number;
  fingerprinting an access point wireless network frame to identify at least one of a manufacturer and a configuration setting for a corresponding access point; and
  determining that the at least one of the manufacturer and the configuration setting is associated with public wireless network installations;

receive a request for information indicating whether the local area wireless network corresponds to a public wireless network; and transmit, in response to the request, a network packet indicating that the local area wireless network has been flagged as the public wireless network, wherein:

a security server collects the packet information from the set of client devices for the local area wireless network; and the security server stores the packet information within a centralized security vendor database that stores parallel packet information for different local area wireless networks across different geographic areas.

* * * * *